United States Patent
Coutu

(10) Patent No.: US 8,256,809 B2
(45) Date of Patent: Sep. 4, 2012

(54) MATERIAL HANDLING TOOL

(76) Inventor: Timothy M. Coutu, Edmonton (CA)

( * ) Notice: Subject to any disclaimer, the term of this patent is extended or adjusted under 35 U.S.C. 154(b) by 0 days.

(21) Appl. No.: 12/851,551

(22) Filed: Aug. 5, 2010

(65) Prior Publication Data
US 2011/0042982 A1  Feb. 24, 2011

Related U.S. Application Data

(63) Continuation-in-part of application No. 12/545,842, filed on Aug. 23, 2009, and a continuation-in-part of application No. 29/342,343, filed on Aug. 23, 2009, now Pat. No. Des. 626,803.

(51) Int. Cl.
*A01B 1/20* (2006.01)
(52) U.S. Cl. .............................. 294/51; 294/54.5; 294/49
(58) Field of Classification Search .................... 294/51, 294/54.5, 59, 49; 37/266–268
See application file for complete search history.

(56) References Cited

U.S. PATENT DOCUMENTS

| | | | | |
|---|---|---|---|---|
| 896,345 | A * | 8/1908 | Armstrong | 294/51 |
| 1,106,203 | A * | 8/1914 | Gross | 294/51 |
| 1,202,791 | A * | 10/1916 | Brownstein | 37/267 |
| 1,260,276 | A | 3/1918 | Miller | |
| 1,511,073 | A | 10/1924 | Gampher | |
| 2,721,346 | A | 10/1955 | Mora | |
| 2,785,483 | A | 3/1957 | Gajewski | |
| 3,222,699 | A | 12/1965 | Zeisig | |
| 3,727,964 | A * | 4/1973 | Nordvik | 37/268 |
| 3,787,921 | A | 1/1974 | Feldmann | |
| 5,411,101 | A | 5/1995 | Bonavitacola | |
| D385,160 | S | 10/1997 | Tisbo et al. | |
| 5,816,633 | A * | 10/1998 | Odom | 294/51 |
| 5,983,504 | A | 11/1999 | Tisbo et al. | |
| D515,262 | S | 2/2006 | Hay | |
| 2006/0197349 | A1 | 9/2006 | Dawes | |
| 2009/0051180 | A1 | 2/2009 | Marlin | |

FOREIGN PATENT DOCUMENTS

CH  8426 A  5/1894
GB  481624 A  11/1936

* cited by examiner

*Primary Examiner* — Saul Rodriguez
*Assistant Examiner* — Gabriela Puig
(74) *Attorney, Agent, or Firm* — QuickPatents, Inc.; Kevin Prince

(57) ABSTRACT

A tool for manipulating a material, such as snow, ice, sand, salt, dirt, gravel, concrete, vegetation, grains, debris and the like, resting on a surface has an elongated handle, an elongated shaft, and a compound blade head. The handle is attached to a proximal end of the elongated shaft and the compound blade is fixed to a distal end of the elongated shaft. The tool is capable of pushing and pulling materials when operating either the first tool section or the second tool section. The compound blade head has a first tool section adapted generally for shoveling and digging and a second tool section adapted for chopping and scraping. Tamping, compressing, and leveling is achieved when using the tools in the shoveling/digging position. The structure of the tool is designed to endure the stresses and forces of aggressive and repeated operating.

33 Claims, 17 Drawing Sheets

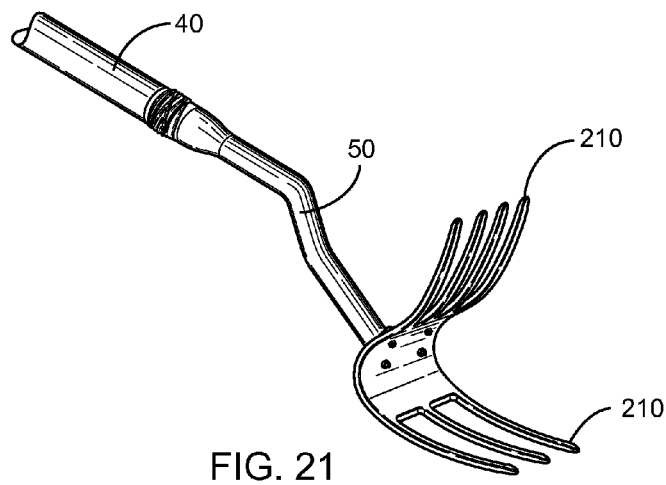
FIG. 21
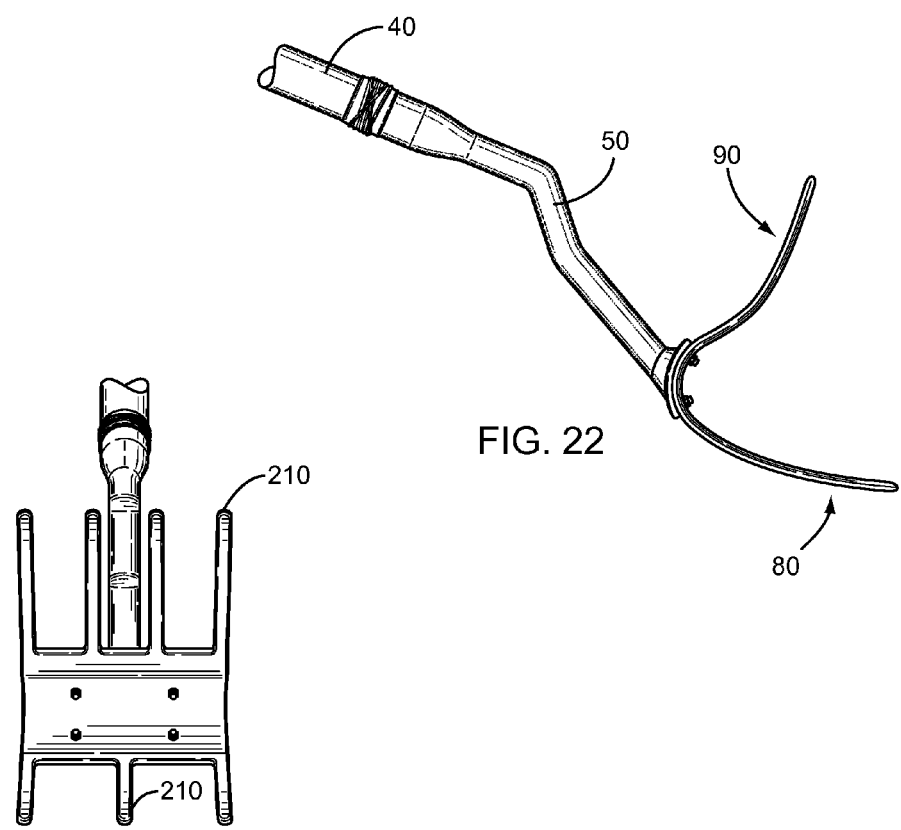
FIG. 22
FIG. 23

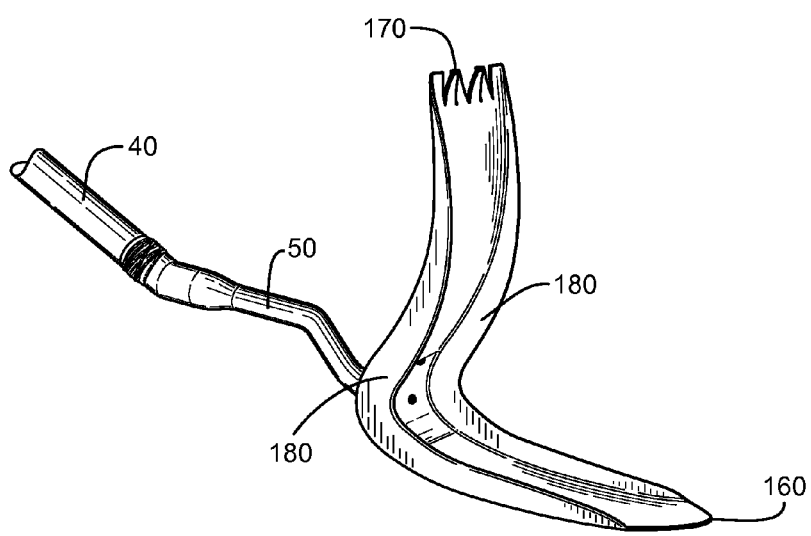
FIG. 24
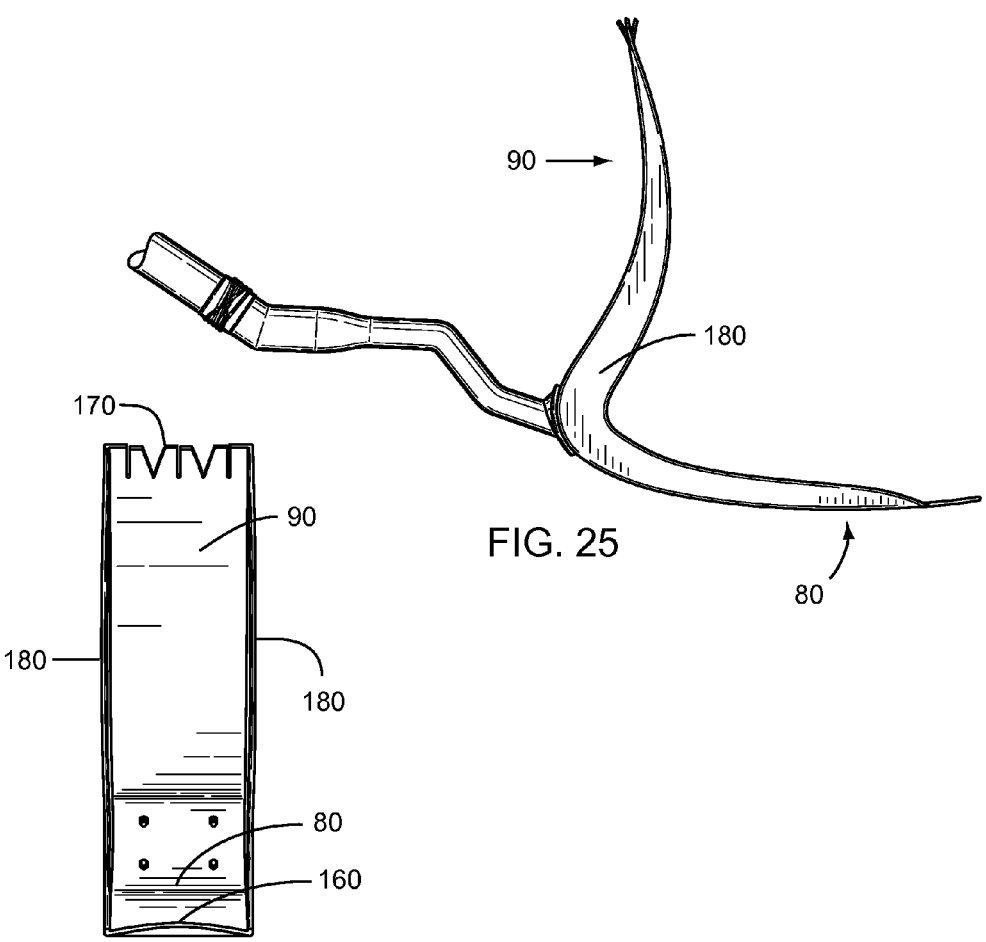
FIG. 25
FIG. 26

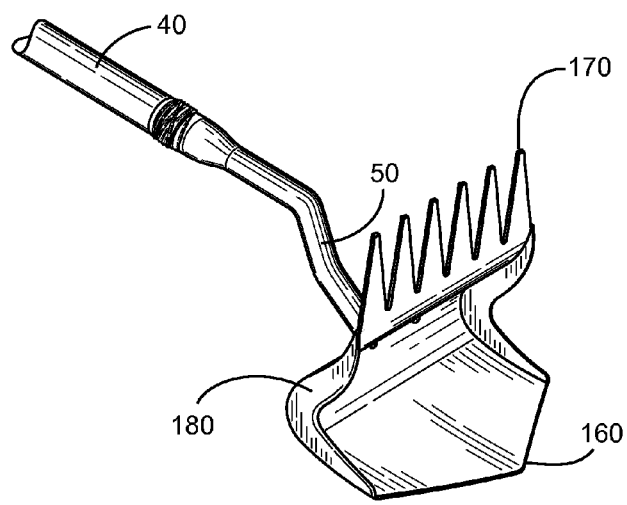
FIG. 42
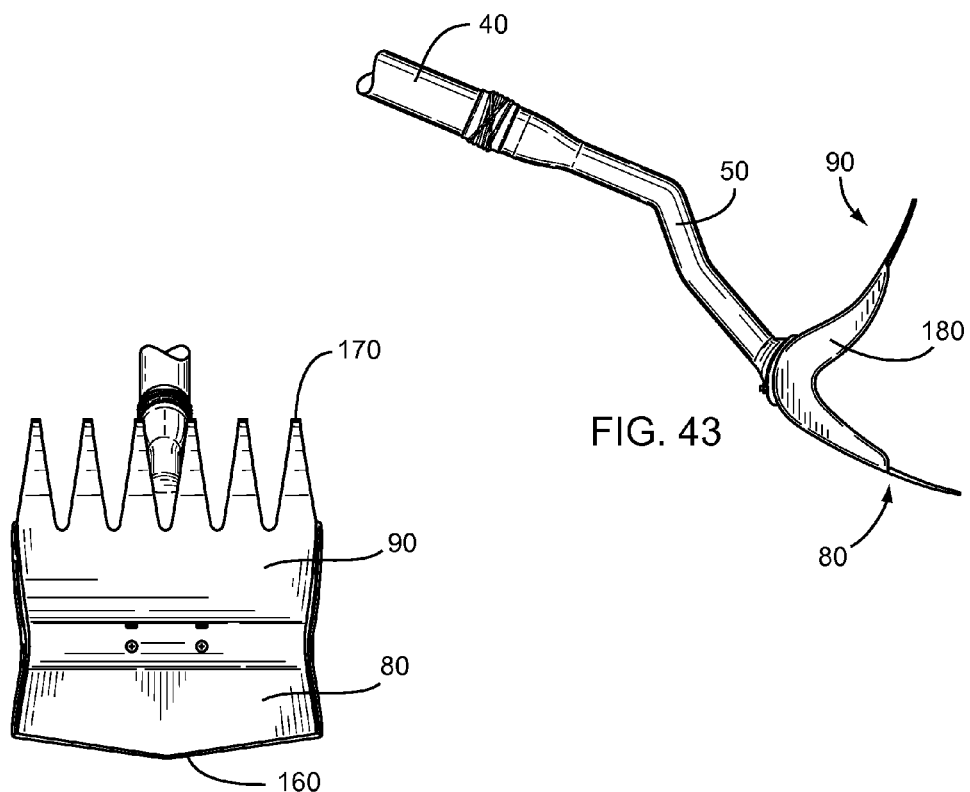
FIG. 43
FIG. 44

MATERIAL HANDLING TOOL

CROSS-REFERENCE TO RELATED APPLICATIONS

The present application is a Continuation-in-Part of U.S. patent application Ser. No. 12/545,842 and U.S. Design patent application Ser. No. 29/342,343, both filed on Aug. 23, 2009, and both included herein by reference.

STATEMENT REGARDING FEDERALLY SPONSORED RESEARCH AND DEVELOPMENT

Not Applicable.

FIELD OF THE INVENTION

This invention relates to material handling tools, and more particularly to a combination tool.

DISCUSSION OF RELATED ART

Combination snow shovels are well known in the art. For example, U.S. Pat. No. 1,260,276 to W. H. Miller on Mar. 19, 1918 teaches such a device. Such devices are made to move snow and ice to a desired location. However, despite the development of many approaches to combination snow shovels, these approaches often have significant drawbacks.

U.S. Pat. No. 3,222,699 to L. L. Zeisig on Dec. 14, 1965 teaches a snow shovel with handle mounted ice chopper. The Zeisig device is effective as a shovel and ice chopper. However, the Zeisig device has the disadvantage that the ice chopper is located on the handle of the shovel and the device must be completely inverted to use. In use, the handle will be become wet and dirty and is not an ideal combination of the two devices. Furthermore, the Zeisig device takes time to invert and requires two different techniques of holding the handle. Therefore, a device is needed that does not need to be inverted end-to-end to be used. Furthermore, the needed device would be able to quickly and easily change from the shoveling position to the ice breaking position. Also, the needed device would provide a comfortable and ergonomic angle of the handle in use.

U.S. Pat. No. 1,260,276 to W. H. Miller on Mar. 19, 1918 also teaches a snow shovel and ice chopper. The Miller device teaches attaching an ice chopping blade on the end of the shovel. This approach avoids the problem of having to invert the tool end-to-end and keeps the handle from becoming wet and dirty. However, this approach has the drawback of using a separate attachment that needs to be added and removed depending on needs of the user. Also, the ice chopper attachment is designed to be used in a mostly vertical up-and-down motion transferring the impact of breaking the ice primarily vertically up the handle of the tool. Therefore, there is a need for a device that does not need a separate attachment for each function. Furthermore, a device is needed where the structure of the ice chopper function avoids direct transfer of impact up the handle and limits the impact of repetitive motion of breaking ice.

Two published applications teach combination snow shovels that are made of one-piece and do not need attachments. US Patent Application 2006/0197349 by Dawes published on Sep. 7, 2006 teaches a combination snow shovel and snow plow. US Patent Application 2009/0051180 A1 by Marlin published on Feb. 26, 2009 teaches a snow removal tool for the pushing and pulling of snow. However, neither one of these devices provides the ability to aggressively and repeatedly dig and chop snow, compacted snow, ice, slush and the like. They are suitable for their designed function of pushing and pulling freshly fallen snow, but they are clearly not designed and do not disclose a structure to withstand vigorous digging and chopping in a forceful and repetitive manner. Therefore, there is a need for a device that in addition to providing the functions of is pushing and pulling, further includes the structural design integrity and sturdiness to endure the stresses and forces of aggressive and repeated digging and chopping most often associated with manipulation and removal of snow, compacted snow, ice, slush and the like.

In my previously filed parent application, I taught a combination tool that overcame the above drawbacks and is particularly well-suited for handling snow and ice removal. Yet some of the features taught therein, it has been found, are applicable to a much wider variety of different material handling tools and applications. As such, additional variations and important distinctions are taught in the present application.

Therefore, there is a need for a device that does not require being inverted end-to-end to be used. Furthermore, the needed device would be able to quickly and easily change from the shoveling position to the ice breaking position. Also, the needed device would provide a comfortable and ergonomic angle of the handle in use. There is a need for a device that does not need a separate attachment for each function. Clearly there is a need for a device where the structure of the ice chopper or scraper feature avoids direct transfer of impact up the handle and limits the impact to the user of repetitive motion of breaking ice. Further, the needed device would provide the functions of shoveling, pushing, and pulling snow, and include the structure to chop ice and the sturdiness to withstand the forces of repeated ice chopping. Such a needed invention would applicable to a wide variety of different types of materials and applications. The present invention accomplishes these objectives.

SUMMARY OF THE INVENTION

The present device is a tool for manipulating a material resting on a surface. The tool includes an elongated handle having proximal and distal ends. An elongated shaft has a means for attaching to the handle at a proximal end thereof.

A compound head is fixed at a center portion thereof to a distal end of the elongated shaft. The compound blade has a first tool section adapted for shoveling, digging or the like when the first tool section is used at an angle of less than approximately 30 degrees with respect to the surface, the first tool section having a first tangential angel of less than 30 degrees with respect to the elongated handle. The compound blade has a second tool section adapted for chopping or scraping and the like when the second tool section is used at an angle of more than approximately 60 degrees with respect to the surface, the second tool section having a second tangential angle of between 60 and 120 degrees with respect to the elongated handle.

The tool may be used generally to both alternately push and pull the material. The handle is kept at generally the same angle with respect to the surface but rotated to alternately allow either the first tool section to be used generally tangentially to the surface, or to allow the second tool section to be used generally orthogonally to the surface.

Various forms of the first and second tool sections may be taken. For example, the first tool section may include the cutting blade and the second tool section may include a plurality of cutting teeth. Each tool section may include a single or two common side walls. The first tool section may also include at least one sharpened serrated edge for cutting, and may form a sharpened V-shaped blade. The second tool section may include a plurality of tines.

The present invention is a tool that does not require being inverted end-to-end to be used nor does the tool require a separate attachment for each function. The present device may be quickly and easily rotated from a shoveling/digging position to a chopping/scraping position. The disclosed tool provides the function of pushing and pulling in both the shoveling/digging position and in the chopping/scraping position. Tamping, compressing, and leveling features and benefits are achieved when operating the tool in the shoveling/digging position. The structure is sturdy enough to endure the stresses and forces of aggressive and repeated operating. The design of the chopper/scraper feature avoids direct transfer of impact up the handle and thus limits the physical stress to the user during repetitive motion. Furthermore, the device provides a comfortable and ergonomically correct angle of the handle in use. Other features and advantages of the present invention will become apparent from the following more detailed description, taken in conjunction with the accompanying drawings, which illustrate, by way of example, the principles of the invention.

DESCRIPTION OF THE DRAWINGS

FIG. 21 is a perspective view of a "Dual Pitchfork" embodiment of the invention;

FIG. 22 is a right-side elevational view of the embodiment of FIG. 21, the left-side elevational view being a mirror image thereof;

FIG. 23 is a front elevational view of the embodiment of FIG. 21;

FIG. 24 is a perspective view of a "Trencher" embodiment of the invention;

FIG. 25 is a right-side elevational view of the embodiment of FIG. 24, the left-side elevational view being a mirror image thereof;

FIG. 26 is a front elevational view of the embodiment of FIG. 24;

FIG. 42 is a perspective view of a "Firefighter's Tool" embodiment of the invention;

FIG. 43 is a right-side elevational view of the embodiment of FIG. 42, the left-side elevational view being a mirror image thereof;

FIG. 44 is a front elevational view of the embodiment of FIG. 42;

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
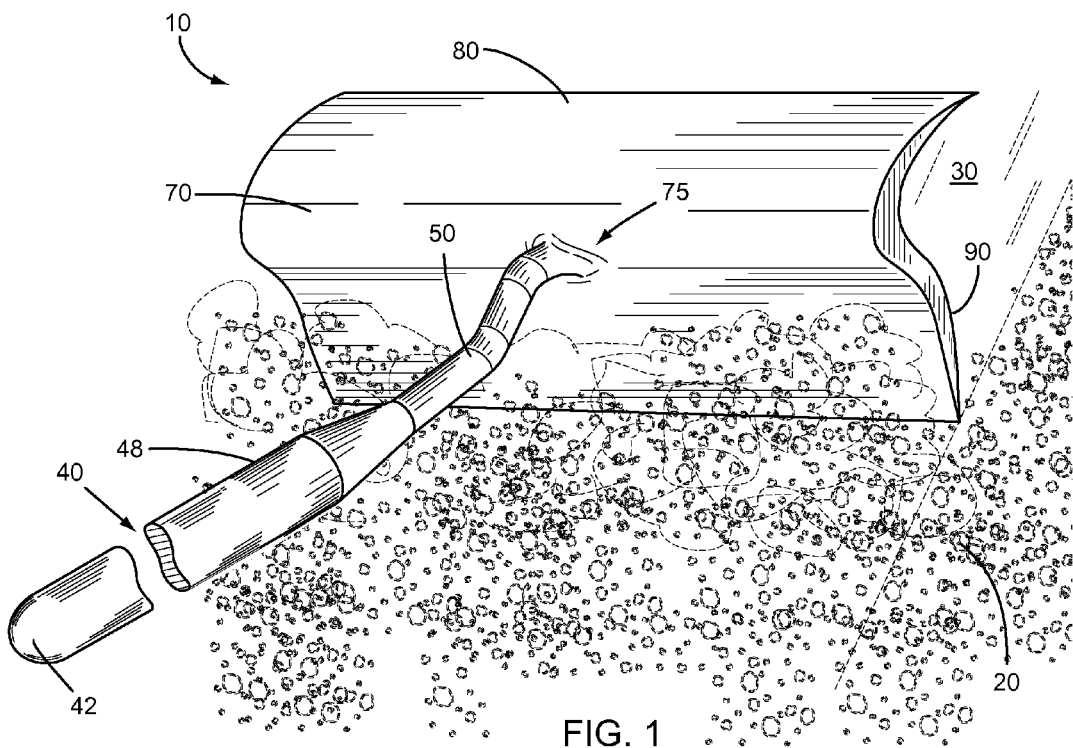
FIG. 1 is a perspective view of a first embodiment of the invention, illustrating a tool manipulating a material on a surface with a second tool section.
Figure 3:
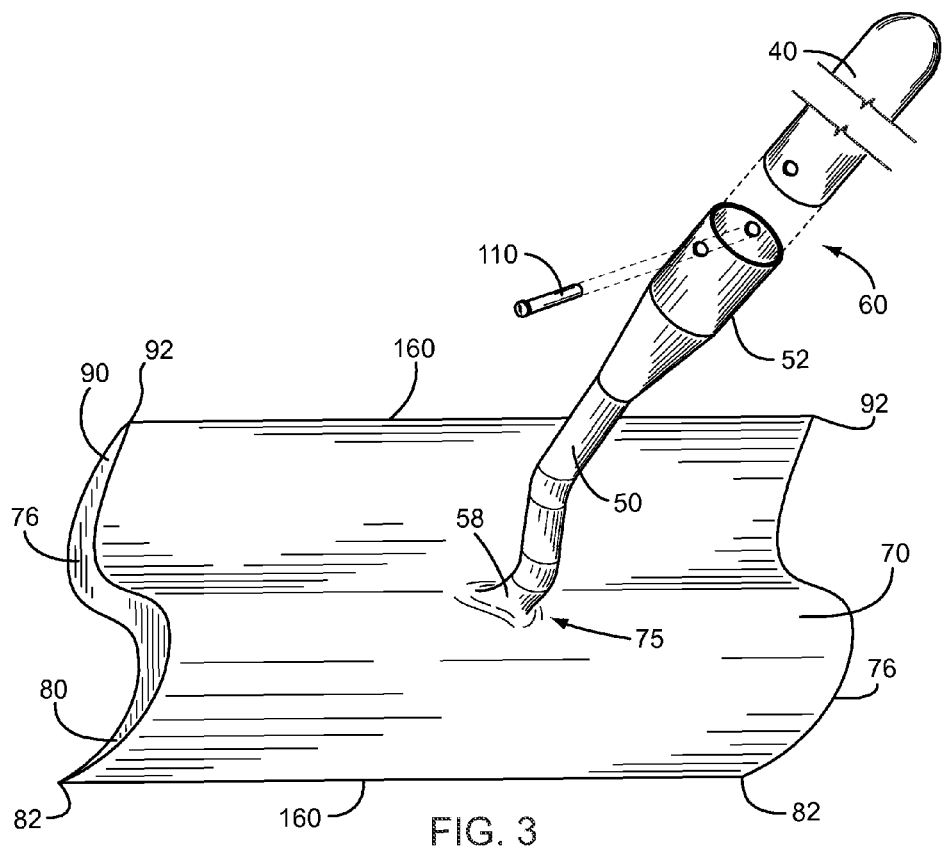
FIG. 3 is a partially exploded perspective view of the invention, illustrating a pin, an elongated shaft, an elongated handle, and a compound head.

With respect to the drawings, FIG. 1 illustrates a tool 10 for manipulating a material 20 resting on a surface 30. The material 20 can be a variety of materials, such as snow, ice, slush, sand, salt, dirt, gravel, concrete, grains, and the like. The tool 10 includes an elongated handle 40 having proximal 42 and distal ends 48, as illustrated in FIG. 1. In FIG. 3, an elongated shaft 50 of the tool 10 has a means for attaching 60 to the handle 40 at a proximal end 52 thereof. Such a handle may be several inches to several feet long, typically.

Figure 2:
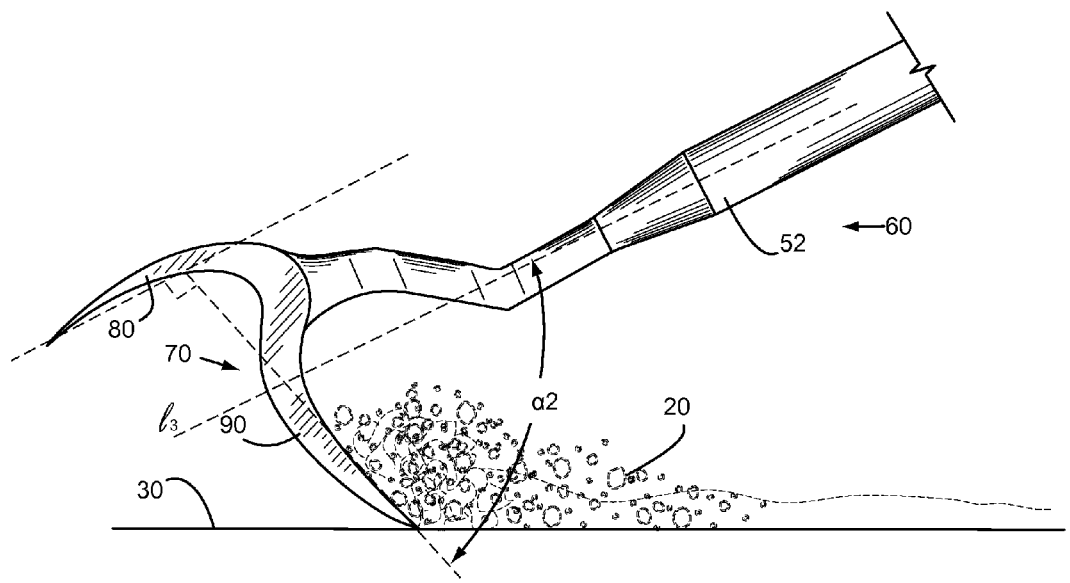
FIG. 2 is a side elevational view of another embodiment of the invention.
Figure 4:
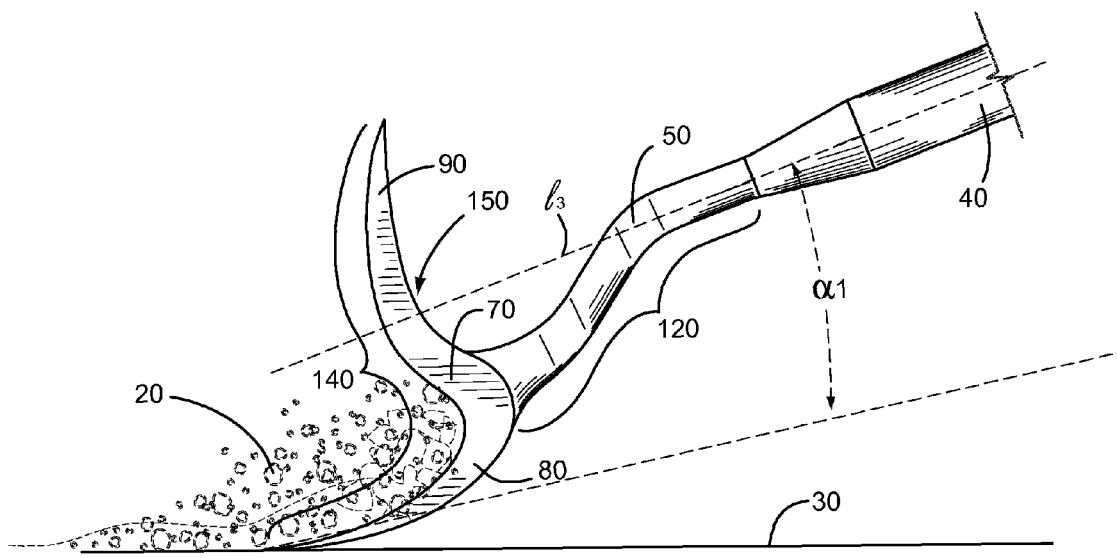
FIG. 4 is a side elevational view of the invention in a shoveling position with a first tool section.

In FIGS. 2 and 3, a compound head 70 is fixed at a center portion 75 thereof to a distal end 58 of the elongated shaft 50. The compound head 70 has a first tool section 80 having a first tangential angle $\alpha_1$ of less than 30 degrees with respect to the elongated handle 40, as illustrated in FIG. 4. The compound head 70 has a second tool section 90 having a second tangential angle $\alpha_2$ of between 60 and 120 degrees with respect to the elongated handle 40, as illustrated in FIG. 2. When the compound head 70 is rotated such that the first tool section 80 is below the second tool section 90, the tool 10 may be readily used in a shoveling or digging fashion along the surface 30, the first tool section 80 working the materially 20 substantially tangentially to the surface 30. Herein the term "shoveling" may also refer to leveling, tamping, digging, and like actions that require a tool that is more parallel to the surface than orthogonal. When the compound head 70 is rotated such that the second tool section 90 is below the first tool section 80, the tool 10 may be readily used in a chopping or hoe-type fashion into the surface 30, the second tool section 90 working the material 20 substantially orthogonally to the surface 30. Herein, the term "chopping" may also refer to scraping, piling, digging, hoeing, raking, and the like.

The specific tool sections 80,90 may take many various forms, but generally a side profile of the first tool section 80 can be generally described by a first parabolic expression $P_1$ (FIG. 45), such as $y=\frac{3}{8} x^2 - \frac{1}{4} x$, for example, and a side profile of the second tool section 90 can be generally described by a second parabolic expression $P_2$, which may be the same as the first parabolic expression $P_1$ or not, but rotated with respect to the first parabolic expression $P_1$, such as by 90 degrees. As such, the tool 10 may be used generally to both alternately shovel and dig the material 20. The handle 40 is kept at generally the same angle with respect to the surface 30 but rotated to alternately allow either the first or second tool sections 80,90 to be used on the material 30. In another embodiment, the second tool section 90 is adapted for chopping or scraping the material 20 when the second tool section 90 is used at an angle of more than approximately 60, degrees but less than 90 degrees.

In a simple embodiment, each first and second tool section 80,90 may include a cutting blade 160 (FIG. 3). In one embodiment, the cutting blades 160 of each first and second tool section 80,90 are substantially mutually parallel. The sharpness of each cutting blade 160 contributes to separating materials 20 from surfaces, for example, without the need to thrust excessively downward which may cause damage to the surface 30 and/or pain and injury to the user.

The tool 10 may also be used in additional orientations. In a diagonal orientation (not shown), corners 82, 92 (FIG. 3) of the compound head 70 may be used at various angles to the surface to reach into narrow crevices of the surface 30. In a sideways orientation, side edges 76 may be used to manipulate material 20 near trees and poles and around other structures (not shown) on the surface 30. In one embodiment, each side edge 76 of the compound head 70 is planar, providing the ability to manipulate the material 20 on the surface 30. In another embodiment, each planar side edge 76 is substantially orthogonal to each cutting blade 160.

Figure 5:
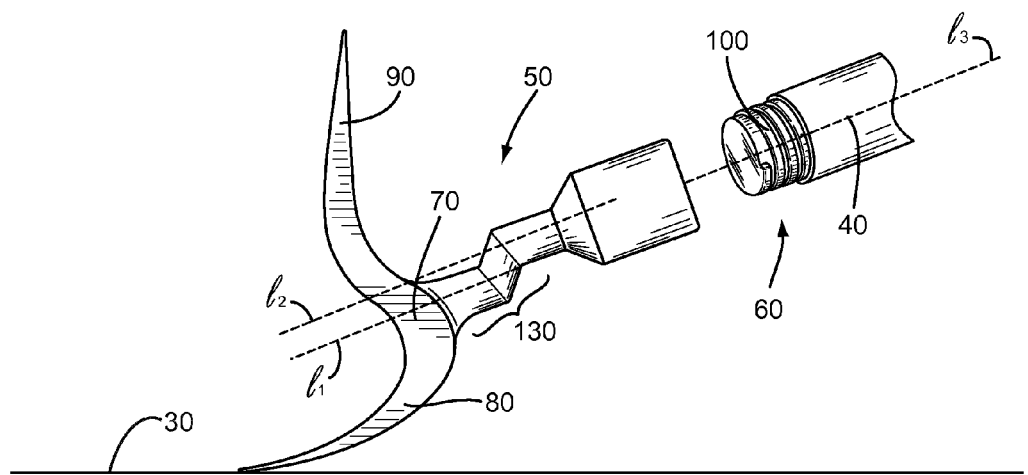
FIG. 5 is a partially exploded side elevational view of the tool, illustrating cooperating screw threads on an elongated handle and shaft, and illustrating discontinuous contours along the elongated shaft.

In one embodiment, illustrated in FIG. 5, the means for attaching 60 the elongated shaft 50 to the handle 40 includes cooperating screw threads 100 on the elongated shaft 50 and the handle 40. In another embodiment, illustrated in FIGS. 3 and 4, the means for attaching 60 the elongated shaft 50 to the handle 40 includes a pin 110 traversing the elongated shaft 50 and handle 60 when mutually attached. The pin 110 secures the handle 40 to the elongated shaft 50. The means for attaching 60 may also be ultrasonic welding, adhesive, metallic welding, or the like. Preferably, however, the handle 40 and the elongated shaft 50 are integrally formed from extruded aluminum tube, the elongated shaft 50 portion being bent and crimped to the proper shape and welded onto the compound head 70 (FIG. 2).

As illustrated in FIG. 5, the longitudinal axes of the distal $l_1$ and proximal ends $l_2$ of the elongated shaft 50 are parallel but distally offset, which provides an ergonomic and efficient angle when using the tool 10. In one embodiment, the offset of the distal end $l_1$ and proximal end $l_2$ is formed by a continuous contour 120 (FIG. 2) along the elongated shaft 50. In another embodiment, the offset of the distal $l_1$ and proximal ends $l_2$ is formed by at least two substantially discontinuous contours 130 (FIG. 5) along the elongated shaft 50. In one embodiment, each first and second tool section 80, 90 includes a continuous contour 140 (FIG. 4) along its length. Generally the longitudinal axis $l_3$ of the handle 40 (FIG. 2) is coincident with the longitudinal axis $l_2$ of the proximal end 52 of the elongated shaft 50, and the longitudinal axis $l_3$ of the handle 40 bisects the second tool section 90.

In one embodiment, the compound head 70 may be formed from a single metal casting process. In another embodiment, the compound head 70 may be formed from an extrusion process. In these embodiments, the elongated shaft 50 may be fixed to the compound head 70 using mechanical fasteners, welding or the like. In one alternate embodiment, the compound head 70 and elongated shaft 50 may be formed from a single metal casting process. The tool 10 is preferably made from a strong and durable material such as a rigid metal material, but can also be formed from any suitable durable rigid material, such as a hard rigid plastic material, if desired. The elongated handle 40 may also be made from a rigid durable material such as wood, fiberglass, or metal.

The size of the tool 10 may be adapted for different sized users and working needs. An advantage of the tool 10 is that it can be a size that is efficient for removing material 20 such as snow, slush and ice from steps (not shown). Some steps are not very deep and the structure of each tool section 80,90 is of a design well suited to be able to effectively remove material 20 from steps. Another advantage is that the tool 10 combines several functions together which can each be used in an ergonomic manner. When the weather is cold and unpleasant, having one device with many features avoids the hassle and inconvenience of carrying multiple devices or going back and forth to retrieve additional devices.

Figure 6:
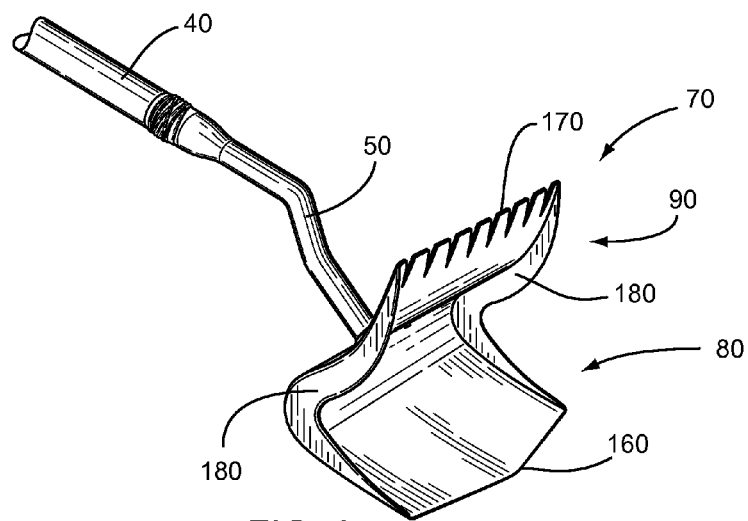
FIG. 6 is a perspective view of a "Back Hoe Hardscaper" embodiment of the invention.
Figure 9:
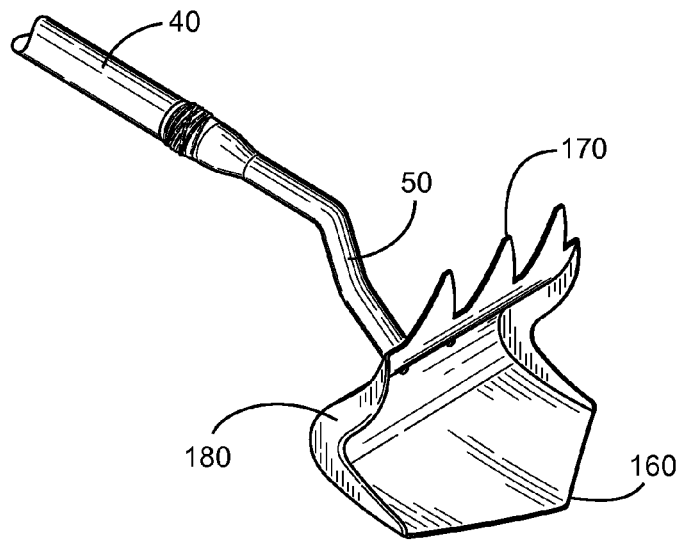
FIG. 9 is a perspective view of a "Compact Dirt Digger" embodiment of the invention.
Figure 15:
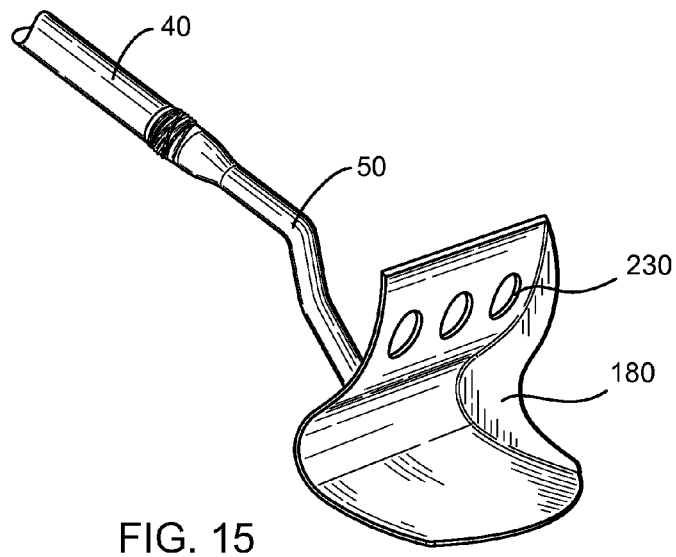
FIG. 15 is a perspective view of a "Mortar Mixer" embodiment of the invention.
Figure 18:
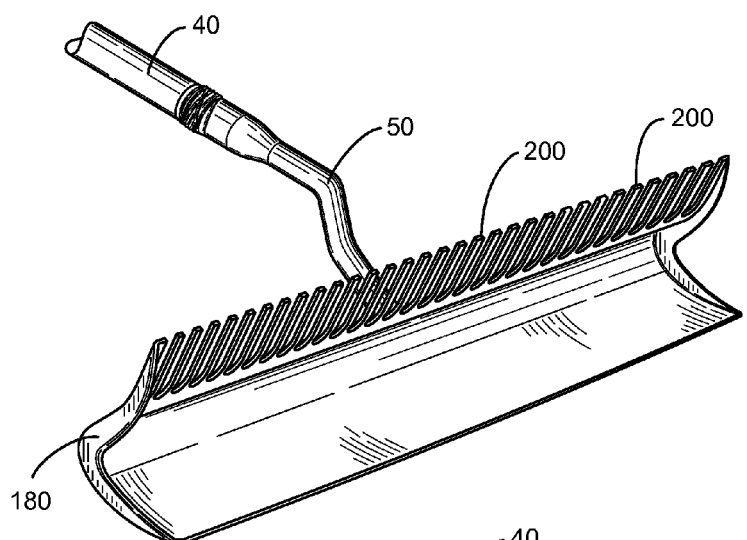
FIG. 18 is a perspective view of a "Landscape Rake & Shovel" embodiment of the invention.
Figure 27:
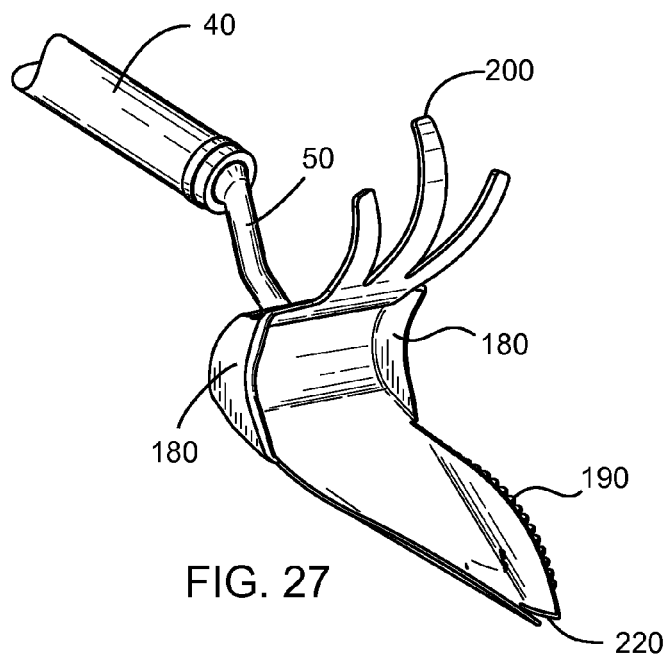
FIG. 27 is a perspective view of a first "Short Handle Gardner" embodiment of the is invention.
Figure 28:
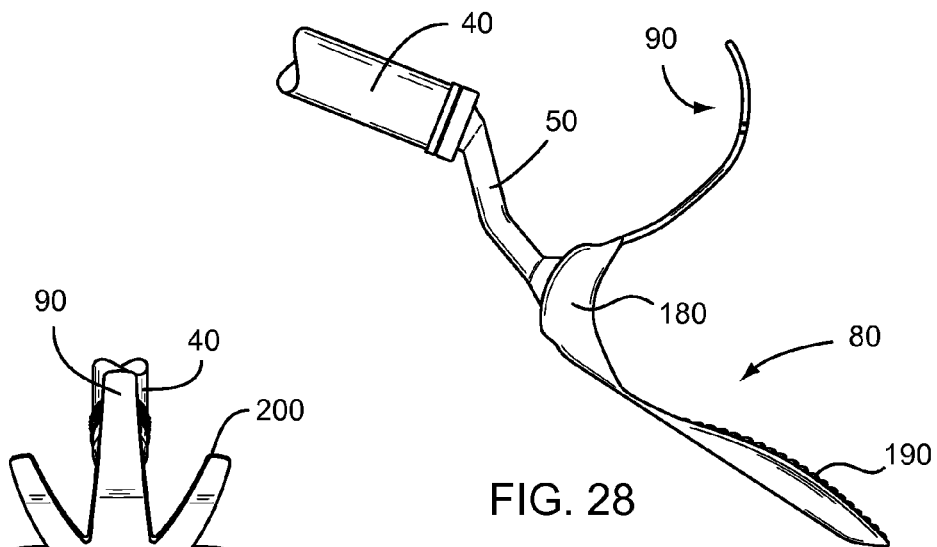
FIG. 28 is a right-side elevational view of the embodiment of FIG. 27, the left-side elevational view being a mirror image thereof.
Figure 29:
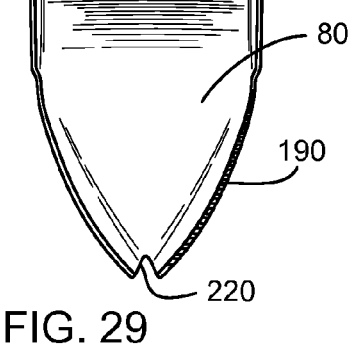
FIG. 29 is a front elevational view of the embodiment of FIG. 27.
Figure 30:
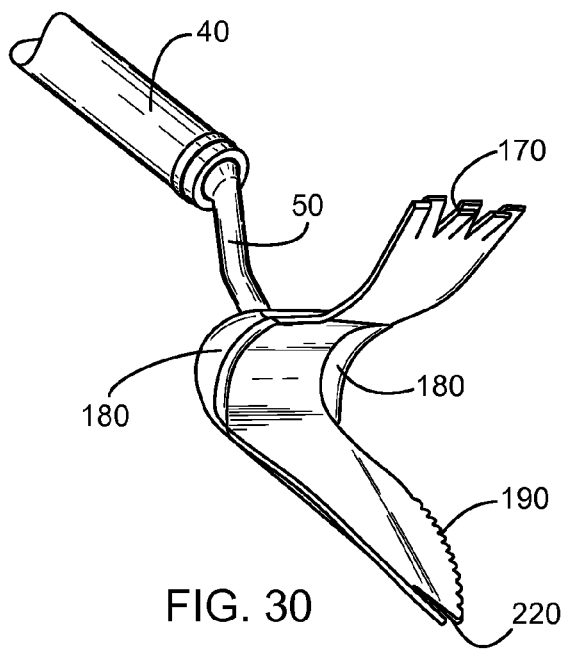
FIG. 30 is a perspective view of a second "Short Handle Gardner" embodiment of the invention.
Figure 31:
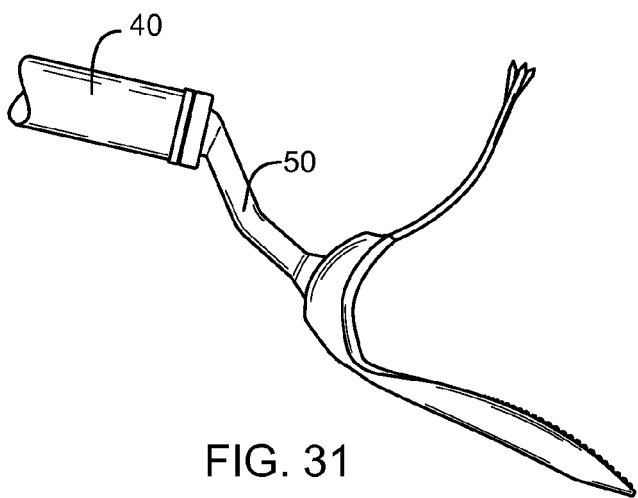
FIG. 31 is a right-side elevational view of the embodiment of FIG. 30, the left-side elevational view being a mirror image thereof.
Figure 32:
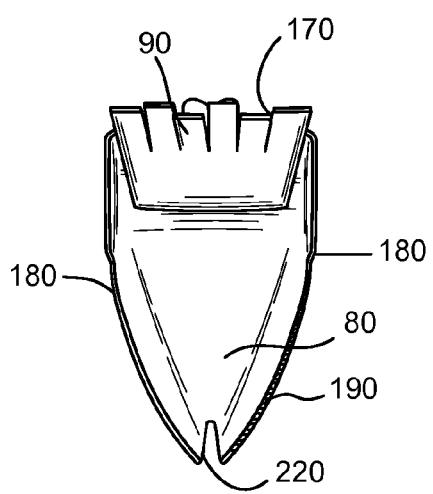
FIG. 32 is a front elevational view of the embodiment of FIG. 30.

Various forms of the first and second tool sections 80,90 may be taken. For example, the first tool section 80 may include the cutting blade 160 and the second tool section may include a plurality of cutting teeth 170 (FIG. 6). Each tool section 80,90 may include a single or two common side walls 180 (FIGS. 9 and 15). The first tool section 80 may also include at least one sharpened serrated edge 190 for cutting (FIG. 12), and may form a sharpened V-shaped blade 220 (FIG. 27). The second tool section 90 may include a plurality of tines 200 (FIG. 18).

Referring now to specific embodiments, FIGS. 1-5 illustrate an embodiment particularly well-suited for chipping and breaking apart ice and packed snow with the second tool section 90, and shoveling same with the first tool section 80.

Figure 7:
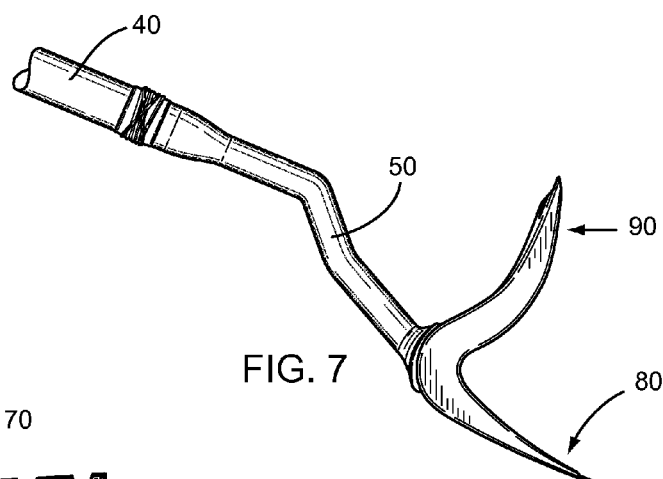
FIG. 7 is a right-side elevational view of the embodiment of FIG. 6, the left-side elevational view being a mirror image thereof.
Figure 8:
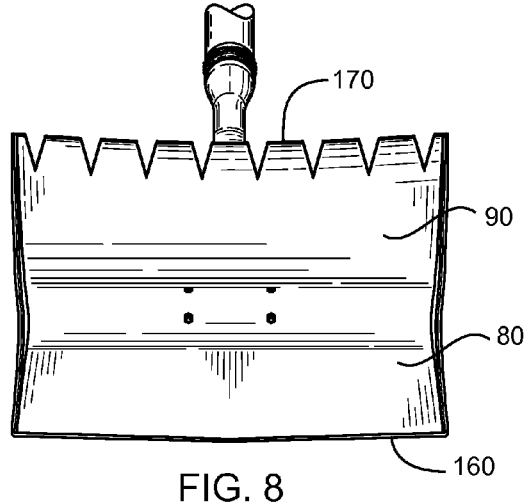
FIG. 8 is a front elevational view of the embodiment of FIG. 6.

FIGS. 6-8 illustrate a "Back Hoe Hardscaper" embodiment particularly well-suited for chopping and cutting with the second tool section 90, the first tool section 80 having the cutting blade 160, and being useful as a step when rotated upwardly to allow a user to apply additional weight to the tool to increase cutting and digging force imparted by the second tool section 90, and for performing tamper, compression, and leveling operations on the material 20. This embodiment is well suited for general hardscaping and landscaping operations.

Figure 10:
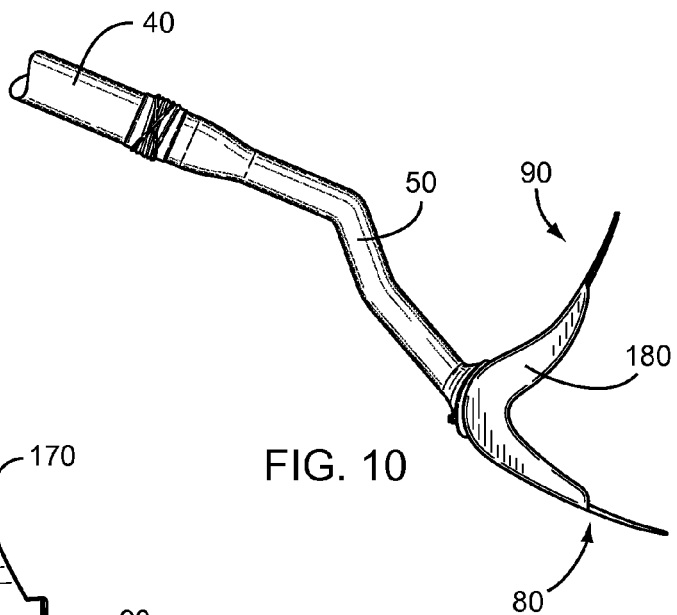
FIG. 10 is a right-side elevational view of the embodiment of FIG. 9, the left-side elevational view being a mirror image thereof.
Figure 11:
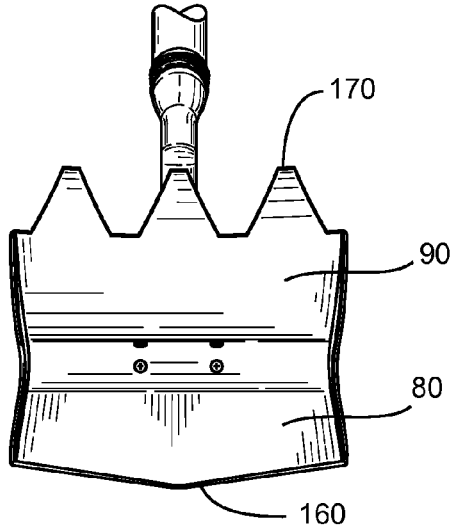
FIG. 11 is a front elevational view of the embodiment of FIG. 9.

FIGS. 9-11 illustrate a "Compact Dirt Digger" embodiment particularly well-suited for chopping with the second tool section 90, the first tool section 80 having the cutting blade 160, and being useful as a step when rotated upwardly to allow a user to apply additional weight to the tool to increase cutting and digging force imparted by the second tool section 90, and for performing tamper, compression, and leveling operations on the material 20. The second tool sections 90 has the plurality of cutting teeth 170 for loosening compact soils, clay, ice, snow and the like. This embodiment is well suited for hardscaping, digging, landscaping, soil aeration, breaking up ice and snow, and general gardening operations, combining many of the functions of a traditional pick axe, spade shovel, Italian hoe, and tamper.

Figure 12:
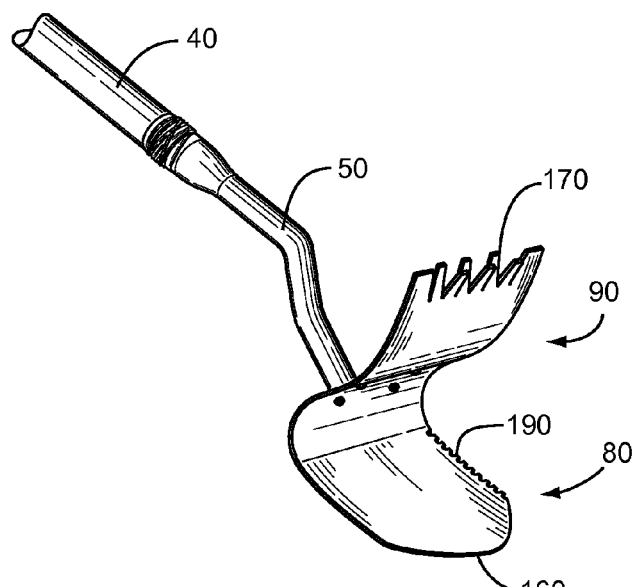
FIG. 12 is a perspective view of a "Multi-Function Gardening" embodiment of the is invention.
Figure 13:
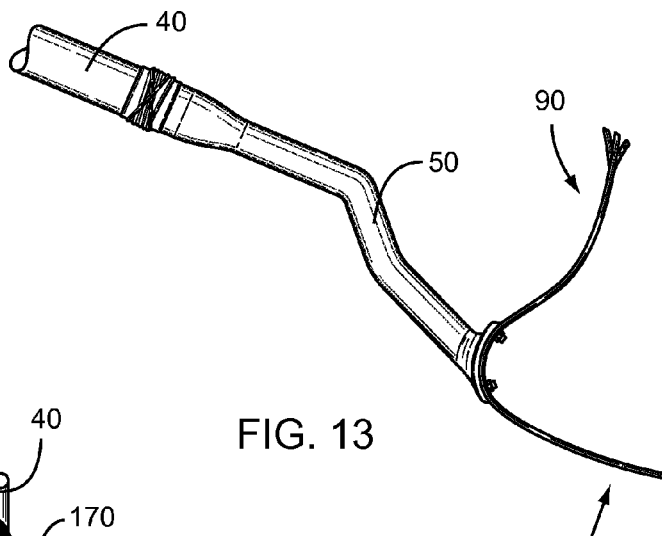
FIG. 13 is a right-side elevational view of the embodiment of FIG. 12, the left-side elevational view being a mirror image thereof.
Figure 14:
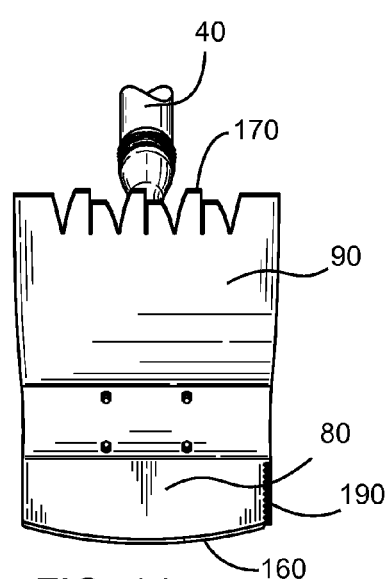
FIG. 14 is a front elevational view of the embodiment of FIG. 12.

FIGS. 12-14 illustrate a "Multi-Function Gardening" embodiment particularly well-suited for gardening. The first tool section 80 has an arc-shaped cutting blade 160 suitable for edging and the like, and is useful as a step when rotated upwardly to allow a is user to apply additional weight to the tool to increase cutting and digging force imparted by the second tool section 90. The first tool section 80 is adapted to facilitate tamper, compression, and leveling operations on the material 20, and includes the sharpened serrated edge 190 for cutting roots and the like. The second tool sections 90 has the plurality of cutting teeth 170 for loosening compact soils, clay, ice, snow and the like. This embodiment is well suited for general gardening operations, combining many of the functions of a traditional edger, spade shovel, Italian hoe, garden hoe, cultivator, hand space, and tamper.

Figure 16:
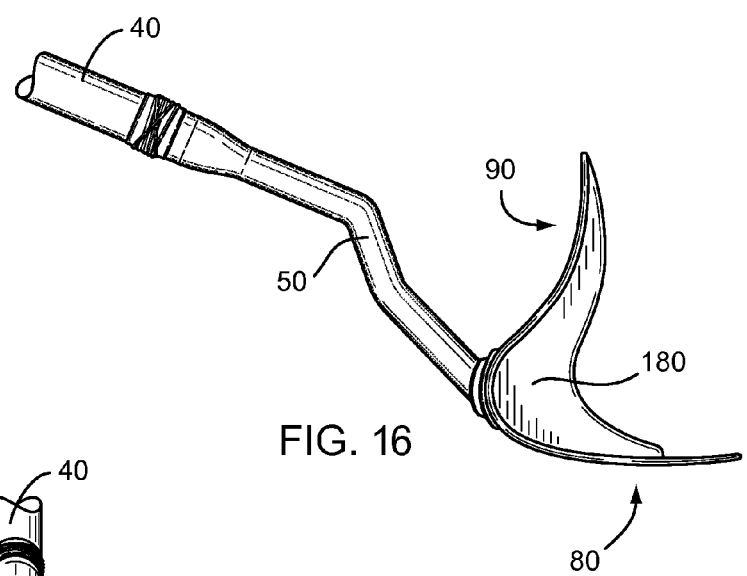
FIG. 16 is a right-side elevational view of the embodiment of FIG. 15, the left-side elevational view being a mirror image thereof.
Figure 17:
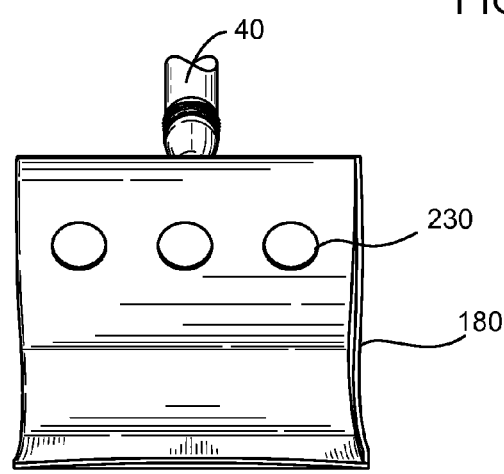
FIG. 17 is a front elevational view of the embodiment of FIG. 15.
Figures 17, 45:
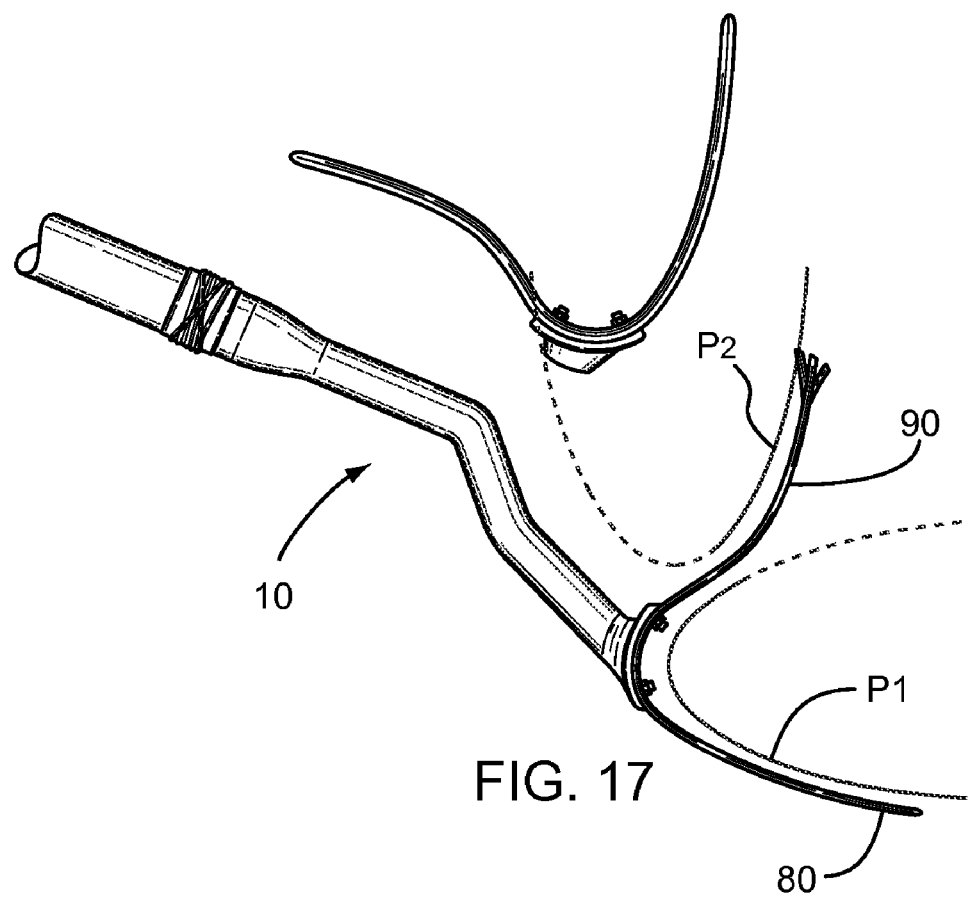
FIG. 45 is a diagram of a first and second parabolic curve associated with the first and second tool sections, respectively.

FIGS. 15-17 illustrate a "Mortar Mixer" embodiment particularly well-suited for working with cement, concrete and mortar materials 20. The first tool section 80 has the side wall 180 that allows the material 20 to be scooped out of a wheelbarrow or other container, for example, and upon rotating of the handle 50 allows such materials 20 to be accurately placed at a job site. The first tool section 80 is adapted to mixing the materials 20 by scooping or shoveling, while not allowing water or moisture to leak away from the materials 20. The second tool sections 90 is adapted for scraping and mixing, and includes a plurality of apertures 230 therethrough for allowing the materials 20 to pass through for more thorough mixing thereof. This embodiment is well suited for general concrete operations, combining many of the functions of a traditional concrete/mortar mixer, spade shovel, and flat shovel.

Figure 19:
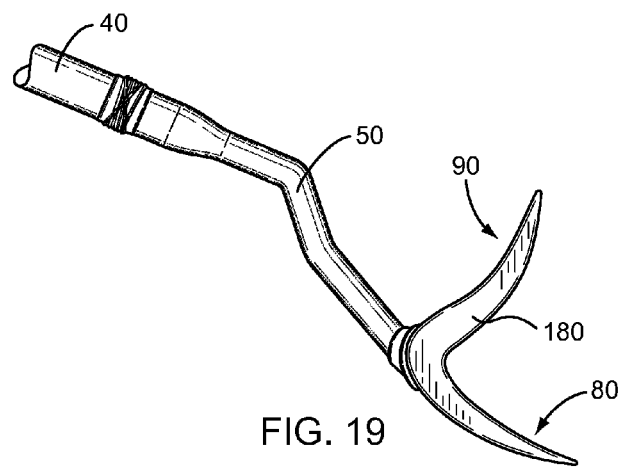
FIG. 19 is a right-side elevational view of the embodiment of FIG. 18, the left-side elevational view being a mirror image thereof.
Figure 20:
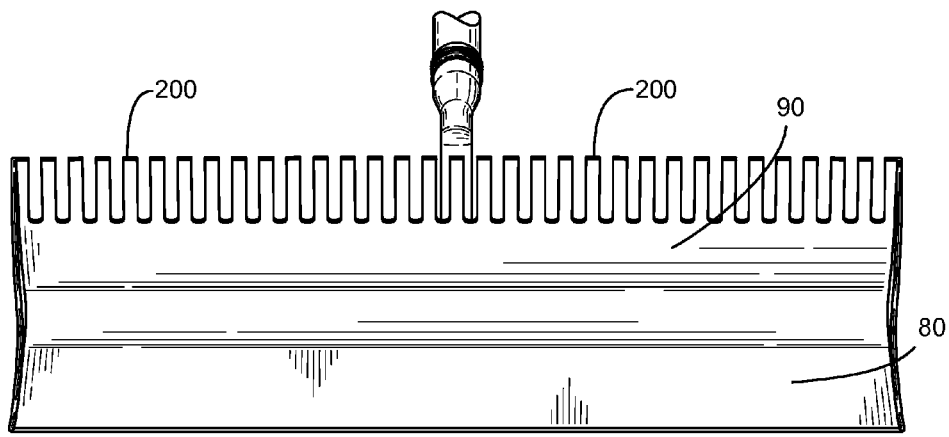
FIG. 20 is a front elevational view of the embodiment of FIG. 18.

FIGS. 18-20 illustrate a "Landscape or Asphalt Rake and Shovel" embodiment particularly well-suited for raking, shoveling, tamping and leveling. The first tool section 80 has a relatively wide shovel 150 and is adapted to facilitate the transfer and leveling of materials such as dirt, bark mulch, gravel, asphalt and the like. The second tool section 90 has the plurality of tines 200 and is adapted for raking materials such as dirt, bark mulch, gravel, asphalt and the like. This embodiment combines many of the functions of a traditional rake, flat shovel, tamper and leveler.

FIGS. 21-23 illustrate a "Dual Pitchfork" embodiment particularly well-suited for transporting materials 20 such as hay, grass, bark-mulch, leaf debris, and the like. The first and second tool sections 80,90 have the plurality of the sharpened prongs 210, which with the second tool section 90 may be used to gather or rake materials into a pile, and with the first tool section 80 penetrate the materials 20 for lifting and transport. This embodiment is well suited for landscaping, combining many of the functions of a traditional pitchfork and cultivator or rake.

FIGS. 24-26 illustrate a "Trencher" embodiment particularly well-suited for digging and forming a narrow trench. The first tool section 80 has an arc-shaped cutting blade 160 suitable for shoveling, and is useful as a step when rotated upwardly to allow a user to apply additional weight to the tool to increase cutting and digging force imparted by the second tool section 90. The first tool section 80 is adapted to facilitate tamper, compression, and leveling operations on the material 20, and includes two of the common side walls 180 for capturing the materials 20 therein for shoveling and lifting. The second tool sections 90 has the plurality of cutting teeth 170 for loosening compact soils, clay, and the like. This embodiment is well suited for trenching operations, combining is many of the functions of a traditional trenching shovel, drain or trenching spade, and tamper.

Figure 33:
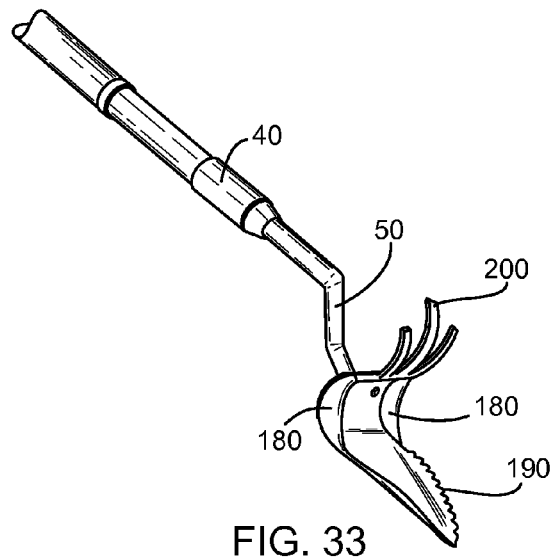
FIG. 33 is a perspective view of an "Extending Garden Tool" embodiment of the invention.
Figure 34:
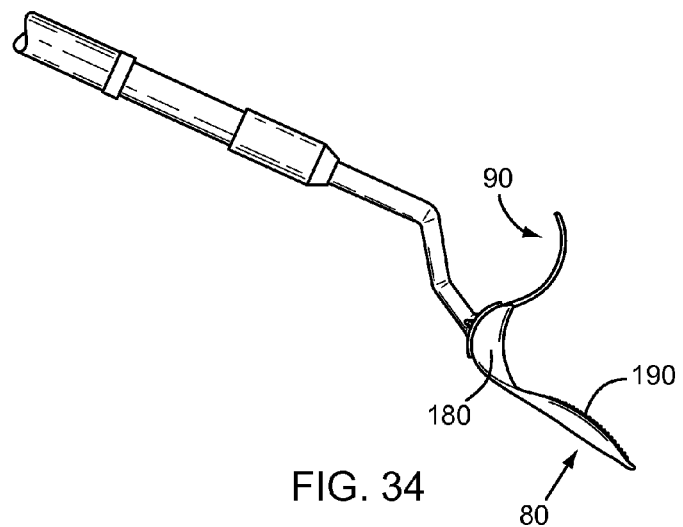
FIG. 34 is a right-side elevational view of the embodiment of FIG. 33, the left-side elevational view being a mirror image thereof.
Figure 35:
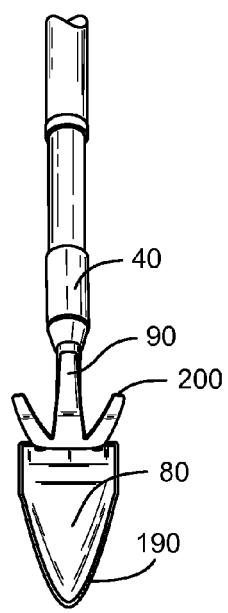
FIG. 35 is a front elevational view of the embodiment of FIG. 33.
Figure 36:
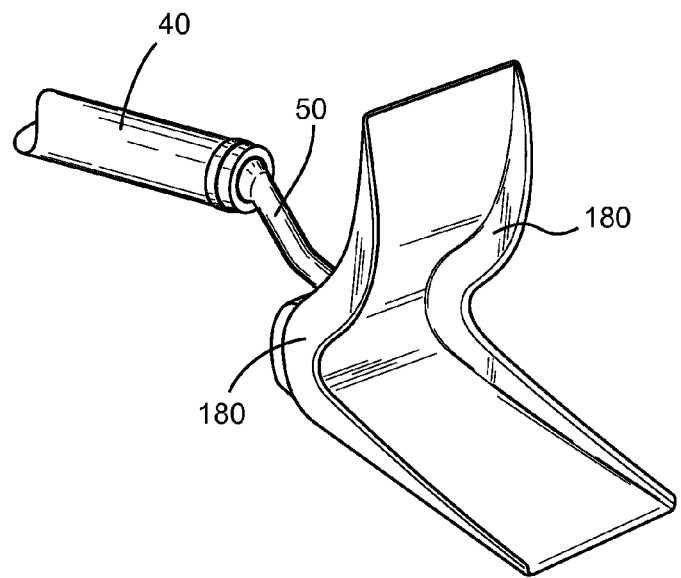
FIG. 36 is a perspective view of a first "Concrete Form" embodiment of the invention.
Figure 37:
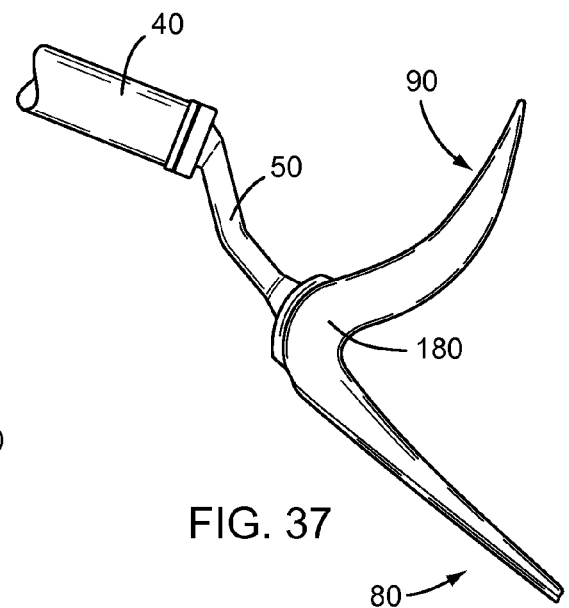
FIG. 37 is a right-side elevational view of the embodiment of FIG. 36, the left-side elevational view being a mirror image thereof.
Figure 38:
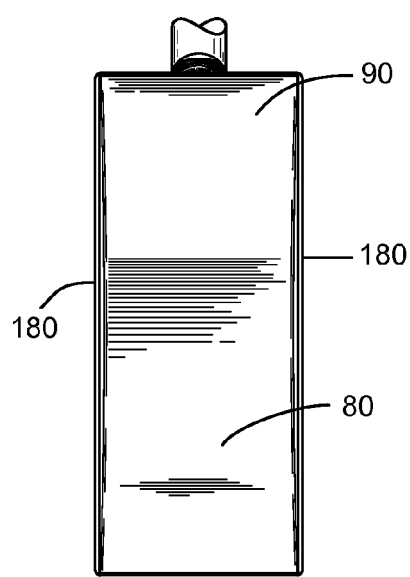
FIG. 38 is a front elevational view of the embodiment of FIG. 36.
Figure 39:
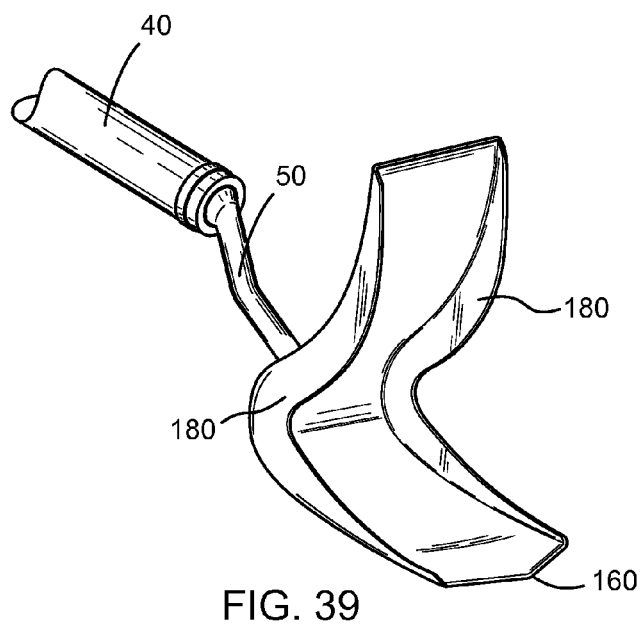
FIG. 39 is a perspective view of a second "Hardscaping Hand Tool embodiment of the invention.
Figure 40:
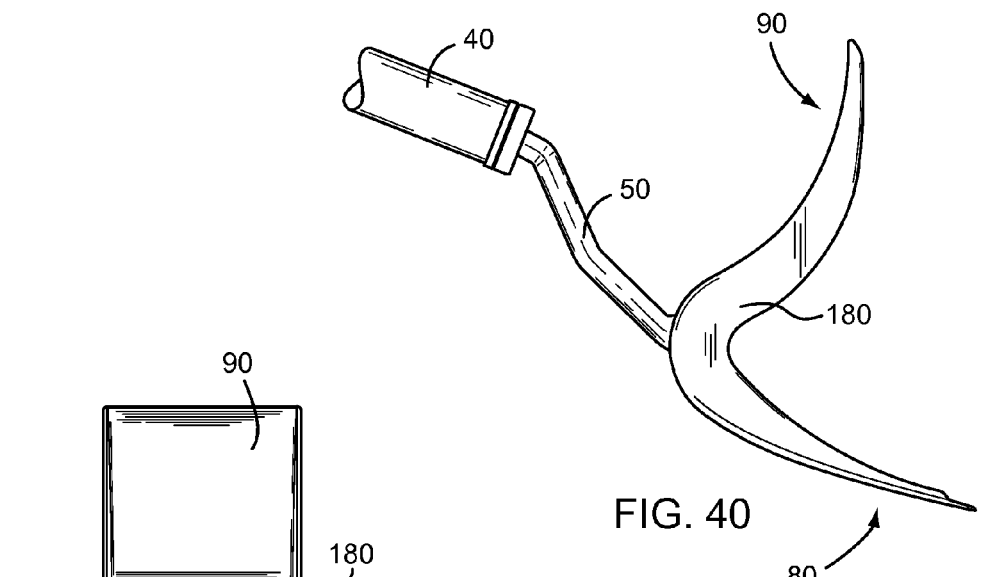
FIG. 40 is a right-side elevational view of the embodiment of FIG. 39, the left-side elevational view being a mirror image thereof.
Figure 41:
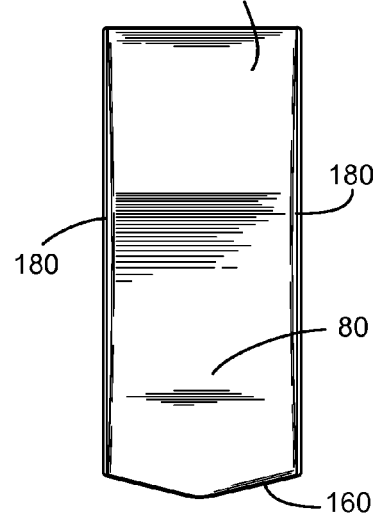
FIG. 41 is a front elevational view of the embodiment of FIG. 39.

FIGS. 27-32 illustrate two "Short Handle Gardner" embodiment particularly well-suited for gardening. The first tool section 80 has the sharpened V-shaped blade 220 suitable for digging, cutting roots, and the like. The first tool section 80 is adapted to facilitate shoveling the material 20, and includes the sharpened serrated edge 190 for cutting roots and the like. The second tool sections 90 has the plurality of tines 200 or cutting teeth 170 for loosening compact soils, clay, and the like. This embodiment preferably includes a relatively short handle for close-up work, and is well suited for general gardening operations, combining many of the functions of a traditional short-handled gardening tools such as trowels, cultivators, weed removers, and the like. FIGS. 33-35 show a similar "Extending Garden Tool" embodiment having an adjustable, extendible handle 40.

FIGS. 36-41 illustrate a "Concrete Form" and a "Hardscaping Hand Tool" embodiments particularly well-suited for shaping, forming, and finishing concrete, cement and mortar materials 20. The first and second tool sections 80,90 have the two common side walls 180 that allow the material 20 to be scooped out of a wheelbarrow or other location, for example, in a shoveling motion. The second tool sections 90 is adapted for scraping and mixing. This embodiment is well suited for general concrete finishing operations, combining many of the functions of a traditional concrete/mortar trowels, levelers and tampers.

FIGS. 42-44 illustrate a "Firefighter's Tool" embodiment particularly well-suited for use in firefighting. The first and second tool sections 80,90 have the two common side walls 180 that allow debris and like material 20 to be scooped in a shoveling motion. The second tool sections 90 is adapted for scraping, chopping, breaking, and the like. This embodiment combines many of the functions of a traditional "McLeod" type firefighting tool with a spade or shovel.

While a particular form of the invention has been illustrated and described, it will be apparent that various modifications can be made without departing from the spirit and scope of the invention. For example, the means for attaching 60 the elongated shaft 50 to the handle 40 may include gluing, welding, or additional mechanical fasteners. Accordingly, it is not intended that the invention be limited, except as by the appended claims.

The teachings provided herein can be applied to other systems, not necessarily the system described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in its implementation details, while still being encompassed by the invention disclosed herein.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the is invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventor contemplates the various aspects of the invention in any number of claim forms.

Accordingly, the inventor reserves the right to add additional claims after filing the application to pursue such additional claim forms for other aspects of the invention.

What is claimed is:

1. A tool for manipulating a material resting on or part of a surface, the tool comprising:
    an elongated handle having proximal and distal ends;
    an elongated shaft at a proximal end of the elongated handle; and
    a compound head fixed at a center portion thereof to a distal end of the elongated shaft, the compound head having a first tool section having a first tangential angle at an end of the first tool section of less than 30 degrees with respect to the elongated handle, and having a second tool section having a second tangential angle at an end of the second tool section of between 60 and 120 degrees with respect to the elongated handle;
    said first tool section having a side profile that defines a first parabolic expression and said second tool section having a side profile that defines a second parabolic expression rotated with respect to the first parabolic expression;
    said first and second tool sections having a continuous, non-flat transition between said parabolic expressions;
    said distal and proximal ends of the elongated shaft having longitudinal axis that are distally offset;
    whereby the tool may be used alternately in a first orientation to work the material using the first tool section, or by rotating the handle 180 degrees in a second orientation to work the material using the second tool section.

2. The tool of claim 1 wherein the elongated shaft is attached to the handle by at least one of welding and an attachment comprising at least one of cooperating screw threads on the elongated shaft and the handle and a pin traversing the elongated shaft and handle when mutually attached, the pin securing the handle to the elongated shaft.

3. The tool of claim 1 wherein the elongated shaft comprises at least two substantially discontinuous contours along the elongated shaft.

4. The tool of claim 1 wherein the compound head is formed from a single metal casting process.

5. The tool of claim 1 wherein the longitudinal axis of the handle intersects the second tool section at an intersection point and the shaft is attached to the first tool section at a point along the parabolic expression of the first tool section.

6. The tool of claim 1 wherein the distal end of the elongated shaft is attached to the compound head at an apex of the first tool section.

7. The tool of claim 1 wherein the first tool section and the second tool section include a single common side wall that follows the shape of said first and second parabolic expressions.

8. The tool of claim 1 wherein the first tool section and the second tool section include two common side walls that follows the shape of said first and second parabolic expressions.

9. The tool of claim 1 wherein the elongated handle and elongated shaft are integrally formed from an extruded metal tube.

10. The tool of claim 1 wherein at least one of the first tool section and the second tool section comprises one of a cutting blade, a sharpened serrated edge, a sharpened V-shaped notch, a plurality of cutting teeth, a plurality of tines, a plurality of sharpened prongs, and a plurality of apertures in a blade.

11. A tool for manipulating a material resting on or part of a surface, the tool comprising:
an elongated handle having proximal and distal ends;
an elongated shaft at a proximal end of the elongated handle; and
a compound head fixed to a distal end of the elongated shaft, the compound head having a first tool section and a second tool section, the first tool section having a side profile that defines a convex surface relative to the handle, and the second tool section having a side profile that defines a concave surface relative to the elongated handle, the compound head comprising a curvilinear section that forms part of both the convex surface and the concave surface;
the distal end of the elongated shaft being offset from a longitudinal axis of the elongated handle;
whereby the tool may be used alternately in a first orientation to work the material using the first tool section, or by rotating the handle 180 degrees in a second orientation to work the material using the second tool section.

12. The tool of claim 11 wherein the first tool section has a first tangential angle at an end of the first tool section of less than 30 degrees with respect to the elongated handle, and the second tool section has a second tangential angle at an end of the second tool section of between 60 and 120 degrees with respect to the elongated handle.

13. The tool of claim 11 wherein the elongated shaft is attached to the handle by at least one of welding and an attachment comprising at least one of cooperating screw threads on the elongated shaft and the handle and a pin traversing the elongated shaft and handle when mutually attached, the pin securing the handle to the elongated shaft.

14. The tool of claim 11 wherein the elongated shaft comprises at least two substantially discontinuous contours along the elongated shaft.

15. The tool of claim 11 wherein the compound head is formed from a single metal casting process.

16. The tool of claim 11 wherein the longitudinal axis of the handle intersects the second tool section at an intersection point and the shaft is attached to the first tool section at a point along the convex surface of the first tool section.

17. The tool of claim 11 wherein the distal end of the elongated shaft is attached to the compound head at an apex of the first tool section.

18. The tool of claim 11 wherein the first tool section and the second tool section include a single common side wall that follows the shape of the side profile of the first and second tool sections.

19. The tool of claim 11 wherein the first tool section and the second tool section include two common side walls that follows the shape of the side profile of the first and second tool sections.

20. The tool of claim 11 wherein the elongated handle and elongated shaft are integrally formed from an extruded metal tube.

21. The tool of claim 11 wherein at least one of the first tool section and the second tool section comprises one of a cutting blade, a sharpened serrated edge, a sharpened V-shaped notch, a plurality of cutting teeth, a plurality of tines, a plurality of sharpened prongs, and a plurality of apertures in a blade.

22. A tool for manipulating a material resting on or part of a surface, the tool comprising:
an elongated handle having proximal and distal ends;
an elongated shaft at a proximal end of the elongated handle; and
a compound head fixed to a distal end of the elongated shaft, the compound head having a first tool section having a side profile that defines a convex surface relative to the handle, and a second tool section having a side profile that defines a concave surface relative to the elongated handle;
the distal end of the elongated shaft being offset from a longitudinal axis of the elongated handle and being attached to the first tool section at an attachment point along the convex surface of the first tool section, wherein the longitudinal axis of the handle intersects the second tool section at a point spaced from the attachment point;
whereby the tool may be used alternately in a first orientation to work the material using the first tool section, or by rotating the handle 180 degrees in a second orientation to work the material using the second tool section.

23. The tool of claim 22 wherein the first tool section has a first tangential angle at an end of the first tool section of less than 30 degrees with respect to the elongated handle, and the second tool section has a second tangential angle at an end of the second tool section of between 60 and 120 degrees with respect to the elongated handle.

24. The tool of claim 22 wherein the offset of the distal and proximal ends is formed by at least two substantially discontinuous contours along the elongated shaft.

25. The tool of claim 22 wherein the compound head comprises a section that forms part of both the convex surface and the concave surface.

26. The tool of claim 22 wherein the elongated shaft is attached to the handle by at least one of welding and an attachment comprising at least one of cooperating screw threads on the elongated shaft and the handle and a pin traversing the elongated shaft and handle when mutually attached, the pin securing the handle to the elongated shaft.

27. The tool of claim 22 wherein the compound head is formed from a single metal casting process.

28. The tool of claim 22 wherein the distal end of the elongated shaft is attached to the compound head at an apex of the first tool section.

29. The tool of claim 22 wherein the first tool section and the second tool section include a single common side wall that follows the shape of the side profile of the first and second tool sections.

30. The tool of claim 22 wherein the first tool section and the second tool section include two common side walls that follows the shape of the side profile of the first and second tool sections.

31. The tool of claim 22 wherein the elongated handle and elongated shaft are integrally formed from an extruded metal tube.

32. The tool of claim 22 wherein at least one of the first tool section and the second tool section comprises one of a cutting blade, a sharpened serrated edge, a sharpened V-shaped notch, a plurality of cutting teeth, a plurality of tines, a plurality of sharpened prongs, and a plurality of apertures in a blade.

33. A tool for manipulating a material resting on or part of a surface, the tool comprising:
    an elongated handle having proximal and distal ends;
    an elongated shaft at a proximal end of the elongated handle; and
    a compound head fixed to the distal end of the elongated shaft having a first tool section and a second tool section;
    said first tool section having a side profile that defines a first parabolic expression and said second tool section having a side profile that defines a second parabolic expression rotated with respect to the first parabolic expression;
    said first and second tool sections having a curvilinear transition between said parabolic expressions;
    whereby the tool may be used alternately in a first orientation to work the material using the first tool section, or by rotating the handle 180 degrees in a second orientation to work the material using the second tool section.

\* \* \* \* \*